United States Patent

[11] 3,596,616

| [72] | Inventors | Jack L. Bauman<br>Naperville;<br>John F. Reynolds, Downers Grove, both of, Ill. |
|---|---|---|
| [21] | Appl. No. | 769,284 |
| [22] | Filed | Oct. 21, 1968 |
| [45] | Patented | Aug. 3, 1971 |
| [73] | Assignee | International Harvester Company<br>Chicago, Ill. |

[54] SOIL MULCHING DEVICE
2 Claims, 3 Drawing Figs.

[52] U.S. Cl. ................................................ 111/80,
111/84, 171/6, 171/66, 172/720
[51] Int. Cl. ................................................ A01c 5/08
[50] Field of Search ................................................ 111/80, 81,
82, 84, 85; 172/44, 720, 772; 171/6, 45, 66

[56] References Cited
UNITED STATES PATENTS

| 1,266,376 | 5/1818 | Alexander et al. | 171/66 |
| 1,269,877 | 6/1918 | Sturrock | 111/82 X |
| 1,384,631 | 7/1921 | Parschauer | 172/44 |
| 1,635,866 | 7/1927 | Townsend et al. | 111/85 |
| 2,869,489 | 1/1959 | Buhr | 111/80 |
| 3,447,495 | 6/1969 | Miller et al. | 172/720 X |

Primary Examiner—Clyde I. Coughenour
Attorney—Noel G. Artman

ABSTRACT: A soil tilling and mulching device including a soil penetrating tool with a chain attached to it in such a manner as to form a catenary and be drawn under the surface of the soil to dislodge undesirable vegetation, produce a surface mulch and to mix surface deposited chemicals into the soil.

PATENTED AUG 3 1971　　3,596,616

INVENTORS
JACK L. BAUMAN
JOHN F. REYNOLDS

ATT'Y

SOIL MULCHING DEVICE

BACKGROUND OF THE INVENTION

This invention relates to improvements in a soil tilling and mulching device, which when used in combination with a chemical applicator mixes the chemicals into the soil.

It is known to deposit chemicals on the surface of the soil, and one of the principal problems encountered has been to mix the chemicals into the soil below the surface layer to prevent the volatilization of the active ingredients of the chemicals by the sun's heat and rays and to prevent chemical loss by surface erosion.

OBJECT

The object of the invention, therefore, is the provision of a novel means for mulching the soil and mixing surface deposited chemicals into the soil so as to improve the ability of the soil to receive and hold moisture and to protect the chemicals from volatilization.

Other objects and advantages of this invention will be apparent to those skilled in the art after referring to the following description and claims taken in conjunction with the accompanying drawings.

DRAWINGS

DETAILED DESCRIPTION OF THE INVENTION

Figures 1, 2, 3:
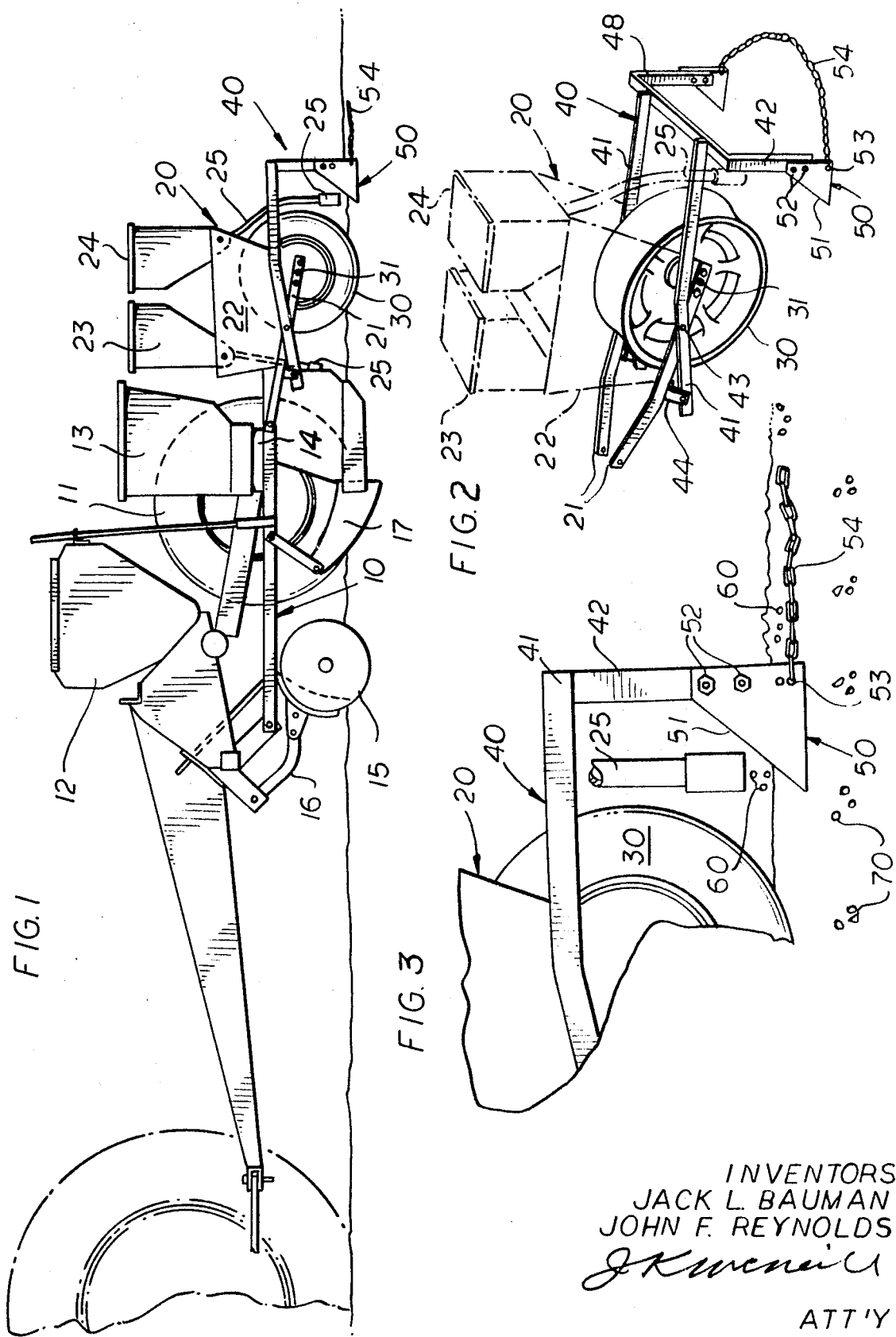
FIG. 1 is a side view showing a planter with an attached chemical applicator and a soil mulching device incorporating the features of this invention, the apparatus being shown in its operating position.
FIG. 2 is a perspective view of the apparatus of this invention.
FIG. 3 is a side view of a portion of the apparatus shown in FIG. 1 showing the features of this invention and their relation to the chemicals deposited on the soil and to the planted seed.

In the following description right-hand and left-hand reference is determined by standing to the rear of the device and facing the direction of travel.

FIG. 1 illustrates a portion of a planter having a main frame 10 adapted to be propelled over the ground on support wheels 11, a fertilizer hopper 12 attached to the main frame 10, with seed hoppers 13 having seed dispensing means 14 and mounted to the main frame 10, a conventional disk fertilizer applicator 15 connected to the main frame 10 by longitudinally extending links 16 and a conventional furrow opener 17 mounted on the main frame 10.

FIGS. 1 and 2 illustrate a chemical applicator 20 attached to the planter main frame 10 by left- and right-hand forwardly extending arms 21 Left- and right-hand side sheets 22 are attached to the respective arms 21 and support the front and rear chemical hoppers 23 and 24. Each chemical hopper has an attached delivery tube 25 which deposits the chemicals on the surface of the ground. A press wheel 30 is carried in bearings 31 secured to the forwardly extending arms 21.

FIG. 2 illustrates a rearwardly extending frame 40 including laterally spaced left- and right-hand bars 41 which are pivotally attached to the chemical applicator arms 21 by means of a pivot bolts 43. Each bar 41 has a portion extending forward and rearward of the pivot bolt 43. The forward portion extends in a slightly downward direction and has an L-shaped stop member 44 attached thereto. The stop member 44 is adapted to engage the lower surface of the arm 21 to control the depth of penetration of the soil penetrating tool 50. The rearward portion of the arm 41 is extended in a direction substantially parallel to the ground. The ends of the rearward portions of the bars 41 are interconnected by a transverse U-shaped tool support 42.

As illustrated in FIGS. 2 and 3, each of the soil penetrating tools 50 comprises a thin blade 51 which is secured to the tool support 42 by bolt means 52. A chain 54 is secured to the lower portion of the blade 51 at attachment points 53 and extends rearwardly and transversely between the laterally spaced blades 51 forming a catenary as illustrated in FIG. 2. The points of attachment 53 of the chain 54 to the tool blades 51, at locations which are disposed between the surface of the ground during operation of the implement, as illustrated in FIG. 3, causes the chain 54 to be drawn under the surface of the ground as the soil penetrating tool 50 is moved in a forward direction. When the chain 54 is drawn under the surface of the ground behind the laterally spaced soil penetrating tools 50, the catenary shape and tumbling action of the chain 54 mixes the surface layer of soil, which contains the chemicals 60 deposited on the ground through delivery tubes 25, with the lower layers of soil thereby incorporating the chemicals into a predetermined top layer of soil above the planted seed 70.

OPERATION

The apparatus shown in FIG. 1 is propelled in a forward direction and performs the various functions of a conventional planter including forming a furrow, dispensing fertilizer and seed, covering the seed, applying chemicals such as herbicides and insecticides and compacting the soil. After the chemicals 60 are deposited on the surface of the ground, the soil penetrating tools 50, adapted to travel under the surface of the soil, slice through the soil without substantially disturbing it. The points of attachment of the chain 54 to the soil penetrating tools 50, as illustrated in FIGS. 2 and 3, causes the chain to be drawn under the surface of the ground. The catenary shape of the chain together with its tumbling action mixes the surface soil, containing the deposited chemicals 60, with the lower layer of soil above the planted seed 70 and produces a uniform loose soft top layer of soil with improved ability to receive and hold moisture and prevent erosion.

What we claim is:

1. A planting device comprising
   a main frame;
   furrow opening means carried by said main frame;
   dispensing means, carried by said main frame, adapted to deposit material along the furrow;
   a press wheel having a ground engaging surface, carried by said main frame, that rides on the upper surface of the seed bed;
   soil penetrating tool means, carried by said main frame, said soil penetrating tool means located relative to said press wheel such that it penetrates the soil surface to a depth below said upper surface of the seed bed, said soil penetrating tool means comprising a pair of vertically thin flat blades having their plane parallel to the direction of travel such that they slice through the soil without substantially disturbing it, each of said blades having points of attachment thereon near the lower extremity thereof; and
   articulated link means secured at each end to said blades at said points of attachment and having a length greater than the distance between said points of attachment and disposed to trail behind said tool means and said press wheel under the surface of the soil in catenary form, said articulated link means having a rolling and tumbling action adapted to agitate the soil and mix said material therewith.

2. The invention as set forth in claim 1 wherein said articulated link means is a chain.